US008307397B2

(12) United States Patent
Park

(10) Patent No.: US 8,307,397 B2
(45) Date of Patent: Nov. 6, 2012

(54) VIDEO APPARATUS AND METHOD FOR CONTROLLING THE SAME

(75) Inventor: Sang Hyun Park, Gumi-si (KR)

(73) Assignee: LG Electronics Inc., Seoul (KR)

( * ) Notice: Subject to any disclaimer, the term of this patent is extended or adjusted under 35 U.S.C. 154(b) by 708 days.

(21) Appl. No.: 11/340,611

(22) Filed: Jan. 27, 2006

(65) Prior Publication Data

US 2006/0174281 A1 Aug. 3, 2006

(30) Foreign Application Priority Data

Feb. 3, 2005 (KR) .................. 10-2005-0010022

(51) Int. Cl.
*H04N 5/445* (2011.01)
(52) U.S. Cl. ........................................ 725/59
(58) Field of Classification Search ............ 725/38, 725/58, 105–153, 385
See application file for complete search history.

(56) References Cited

U.S. PATENT DOCUMENTS

| | | | |
|---|---|---|---|
| 5,684,525 A | 11/1997 | Klosterman | |
| 5,808,694 A * | 9/1998 | Usui et al. ............... | 725/49 |
| 6,219,839 B1 | 4/2001 | Sampsell | |
| 6,336,218 B1 * | 1/2002 | Kim ........................ | 725/58 |
| 6,337,719 B1 | 1/2002 | Cuccia | |
| 6,707,508 B1 | 3/2004 | Mears et al. | |
| 7,073,187 B1 * | 7/2006 | Hendricks et al. ....... | 725/36 |
| 7,900,228 B2 * | 3/2011 | Stark et al. .............. | 725/45 |
| 2003/0120912 A1 * | 6/2003 | Sasaki et al. ............ | 713/2 |
| 2003/0200544 A1 * | 10/2003 | Ellis et al. .............. | 725/46 |

FOREIGN PATENT DOCUMENTS

| | | |
|---|---|---|
| CN | 1505390 A | 6/2004 |
| EP | 1 168 692 A1 | 1/2002 |
| JP | 08-275077 | 10/1996 |
| JP | 2000-268440 A | 9/2000 |
| JP | 2002-305710 A | 10/2002 |
| JP | 2004-282790 | 10/2004 |
| WO | WO 90/00847 | 1/1990 |
| WO | WO 99/35848 | 7/1999 |

OTHER PUBLICATIONS

Chinese Office Action dated May 9, 2008.
European Search Report dated May 25, 2011.

* cited by examiner

*Primary Examiner* — Dennis Joseph
(74) *Attorney, Agent, or Firm* — KED & Associates LLP

(57) ABSTRACT

A video apparatus and a method for controlling the same are disclosed, by which a channel selection via an external device is enabled in a manner of controlling the video apparatus by unifying to manage all channel information selectable by the external device in controlling the external device provided with a tuner enabling the channel selection of a specific broadcasting. In a video apparatus receiving a first broadcasting, the present invention includes the steps of storing first broadcasting channel information of the first broadcasting in a combined channel memory within the video apparatus, reading second broadcasting channel information of a second broadcasting from an external device receiving the second broadcasting, and storing the read second broadcasting channel information of the second broadcasting in the combined channel memory.

37 Claims, 5 Drawing Sheets

VIDEO APPARATUS AND METHOD FOR CONTROLLING THE SAME

This application claims the benefit of the Korean Patent Application No. P 10-2005-0010022, filed on Feb. 3, 2005, which is hereby incorporated for all purposes by reference as if fully set forth herein.

BACKGROUND OF THE INVENTION

1. Field of the Invention

The present invention relates to a video apparatus and a method for controlling the same, and more particularly to a video apparatus and a method for controlling the same which facilitate unified management of channel information of various broadcasting systems. Although the present invention is suitable for a wide scope of applications, it is particularly suitable for enabling an user to select a channel provided via an external device by manipulating only the video apparatus.

2. Discussion of the Related Art

Recently, broadcasting systems including terrestrial broadcasting system, satellite broadcasting system, cable broadcasting system and the like become diversified and they are abruptly spreading to use. Yet, since the terrestrial broadcasting system, satellite broadcasting system, cable broadcasting system and the like differ from one another in frequency bands, a satellite broadcast tuner and/or cable broadcast tuner and the like should be separately provided to enable a user to receive the various broadcasts. In particular, an external device having a broadcast tuner and/or a cable broadcast tuner should be separately provided as well as a video device having a built-in terrestrial broadcast tuner.

A video device according to a related art is explained with reference to the attached drawing as follows.

FIG. 1 is a block diagram of a digital video device having an external device for a different broadcast reception according to a related art.

Referring to FIG. 1, a digital video device according to a related art includes a tuner 20 for seeking a channel selected by a user according to a broadcast signal received via an antenna 10. A video signal, an audio signal, channel information and the like of the channel sought by the tuner are parsed by a TP parser 30. The audio and video signals parsed by the TP parser 30 are decoded by an audio decoder 40 and a video decoder 50, respectively. The decoded audio signal is converted to an analog signal by D/A converter 50, while the decoded video signal is processed into a screen-displayable signal through an NTSC encoder 70. The channel information parsed by the TP parser 30 is stored in a memory 100, is processed into OSD-formatted information by an OSP processing unit 110, and is processed into a displayable signal through the NTSC encoder 70. A program for controlling various operations of the video device is stored in the memory 100 as well. A user can request a specific command via a user interface 80. And, a control unit 90 outputs a control signal for controlling an overall operation of the video device according to the command inputted through the user interface 80.

Yet, in the above-configured video device, since the channel information stored in the memory 100 is limited to terrestrial broadcast, channel information received by an external device can be displayed in an external device viewing mode only.

A channel operating method in a video device according to a related art is explained in detail with reference to a flowchart of FIG. 2 as follows.

Referring to FIG. 2, a user turns on a power of a video device and a power of an external device connected to the video device (S10). If the user attempts to obtain channel information of a broadcast received via the external device or to switch to a broadcast channel via the external device, a viewing mode is switched to a viewing mode corresponding to the external device (S20). If the user requests information of the broadcast channel via the external device (S30), the corresponding information is read from the external device (S40) and is then displayed on the video device (S50). Meanwhile, while it is switched to the viewing mode corresponding to the external device, if a specific channel of a broadcast received by the external device is selected using the channel information displayed on the external device or without displaying the channel information (s60), a broadcast signal corresponding to the specific channel is received from the corresponding external device (S7) to be outputted through the video device (S80).

Namely, if a user attempts to obtain information about broadcast channels received by the external device, the power of the external device should be turned on and the viewing mode corresponding to the external device should be selected.

If a user attempts to perform channel switching between broadcastings (e.g., terrestrial broadcasting, cable broadcasting, satellite broadcasting, etc.), he could select a specific channel in a switched viewing mode only after having performed a key operation for switching to a viewing mode of a specific broadcasting from a current viewing mode on the condition that the power of the external device is turned on. Namely, it is inconvenient for a user to perform the viewing mode switching prior to the channel switching. Moreover, in case that the power of the corresponding external device is turned off, a user should perform one activity of turning on the external device and another activity of switching the viewing mode.

SUMMARY OF THE INVENTION

Accordingly, the present invention is directed to a video apparatus and a method for controlling the same that substantially obviate one or more problems due to limitations and disadvantages of the related art.

An object of the present invention is to provide a video apparatus and a method for controlling the same which facilitate unified management of all channel information received via an external device and the video apparatus.

Another object of the present invention is to provide a video apparatus and a method for controlling the same, by which information of all broadcast channels can be combined and managed as soon as a power of the video apparatus connected to an external device is turned on.

A further object of the present invention is to provide a video apparatus and a method for controlling the same, by which selecting and displaying a channel of a broadcast system corresponding to an external device are enabled through the video apparatus even if a power of the external device is turned off.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is a provided a method for controlling a video apparatus, the method comprising storing channel information of a first broadcasting system in a combined channel memory, reading channel information of a second broadcasting system from an external device, and storing the channel information of the second broadcasting system in the combined channel memory.

In another aspect of the present invention, there is provided a video apparatus which receives channel information of a first broadcasting system, the video apparatus comprising an interface to communicate with an external device receiving channel information of a second broadcasting system, a combined channel memory to combine and store the channel information of the first broadcasting system and the channel information of the second broadcasting system, and a controller to read the channel information of the second broadcasting system via the interface, the controller storing the read channel information of the second broadcasting system in the combined channel memory.

In another aspect of the present invention, there is provided a video apparatus which receives channel information of a digital broadcasting system, the video apparatus comprising an interface to communicate with an external device receiving channel information of an analog broadcasting system, a combined channel memory to combine and store the channel information of the digital broadcasting system and the channel information of the analog broadcasting system, and a controller which reading the analog broadcasting system channel information via the interface, the controller storing the read analog broadcasting system channel information in the combined channel memory.

In another aspect of the present invention, there is provided a video apparatus which receives channel information of an analog broadcasting system, the video apparatus comprising an interface to communicate with an external device receiving channel information of a digital broadcasting system, a combined channel memory to combine and store the channel information of the analog broadcasting system and the channel information of the digital broadcasting system, and a controller reading the digital broadcasting system channel information via the interface, the controller storing the read digital broadcasting system channel information in the combined channel memory.

In another aspect of the present invention, there is provided a video apparatus which receives channel information of a digital broadcasting system, the video apparatus comprising an interface to communicate with an external device receiving channel information of a satellite broadcasting system, a combined channel memory to combine and store the channel information of the digital broadcasting system and the channel information of the satellite broadcasting system, and a controller reading the satellite broadcasting system channel information via the interface, the controller storing the read satellite broadcasting system channel information in the combined channel memory.

In another aspect of the present invention, there is provided a video apparatus which receives channel information of a first broadcasting system, the video apparatus comprising an interface to communicate with an external device receiving channel information of a second broadcasting system, a combined channel memory to combine and store the channel information of the first broadcasting system and the channel information of the second broadcasting system, and a controller reading the second broadcasting system channel information via the interface, the controller storing the read second broadcasting system channel information in the combined channel memory, the controller turning on a power of the external device via the interface if a user selects a channel of the second broadcasting system while a power of the external device if turned off.

In another aspect of the present invention, there is provided a method for controlling a video apparatus, the method comprising receiving channel information of a first broadcasting system from an external device, generating a combined channel map based on the channel information of the first broadcasting system and channel information of a second broadcasting system, and storing the combined channel map in a memory of the video apparatus.

Preferably, the external device includes any kind of a device provided with a tuner enabling a reception and channel selection of a specific broadcasting. More preferably, the external device is selected from the group consisting of a VCR, a DVD, a set-top box and a PVR.

Preferably, to provide total information of a broadcast channel to a user, each of the first and second broadcasting channel information includes program titles, broadcast time schedules, broadcast contents, broadcast ratings and a broadcasting station name.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
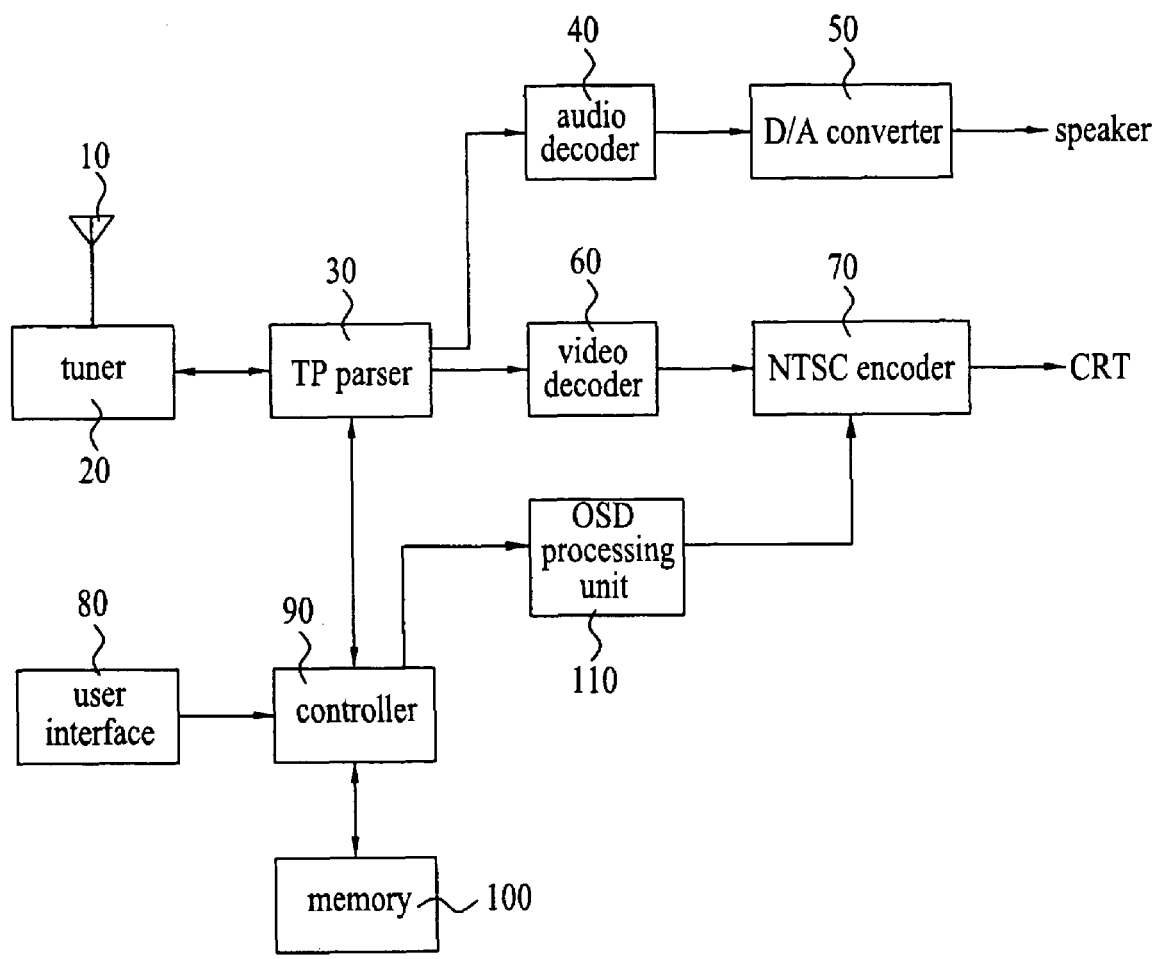
FIG. 1 is a block diagram of a video device according to a related art.
Figure 2:
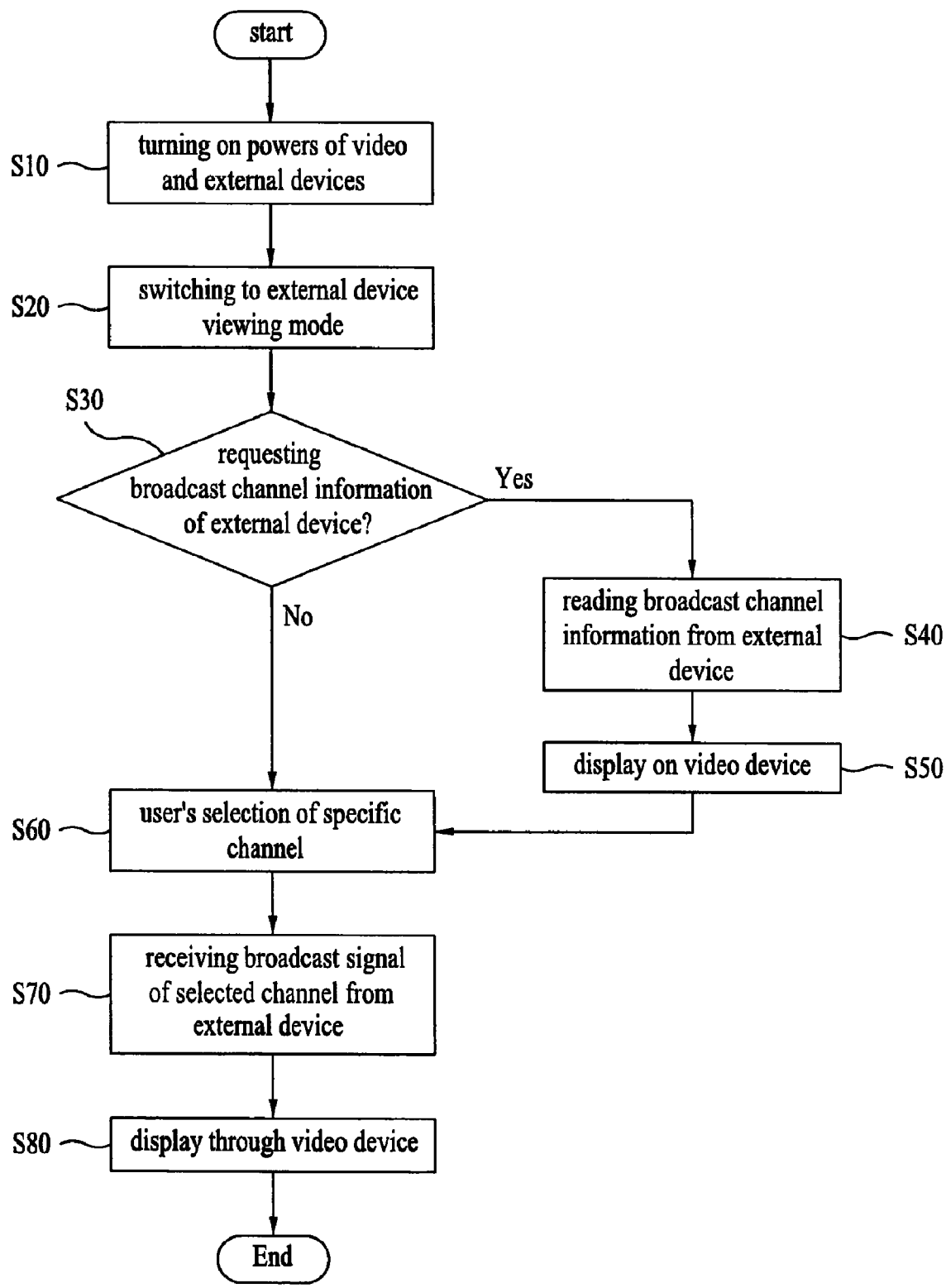
FIG. 2 is a flowchart of a channel operating method in a video device according to a related art.
Figure 3:
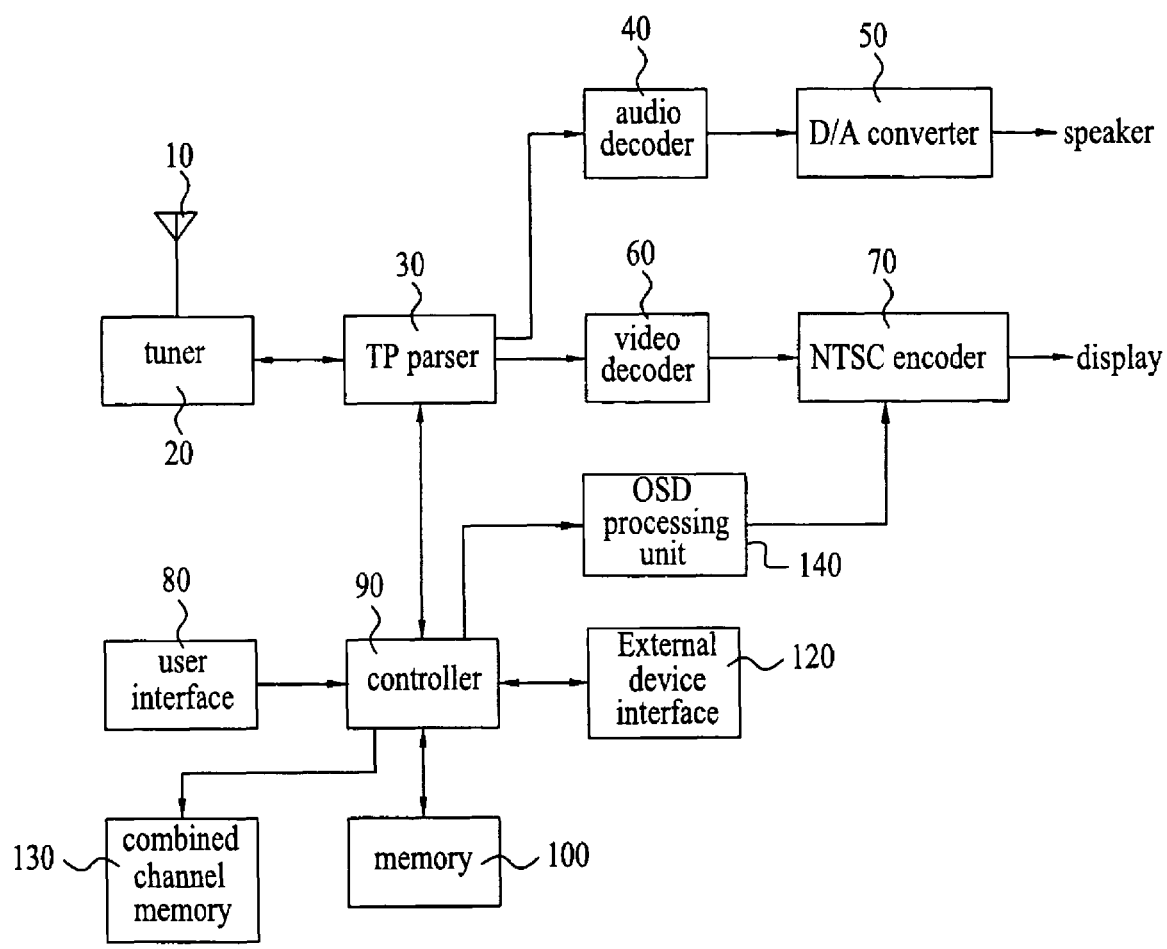
FIG. 3 is a block diagram of a video apparatus according to the present invention.

FIG. 3 is a block diagram of a video apparatus according to the present invention.

In this case, a video apparatus according to the present invention is a video apparatus receiving channel information of a digital terrestrial broadcasting system and an external device receives channel information of satellite broadcasting system.

Referring to FIG. 3, a video apparatus according to the present invention includes an antenna 10, a tuner 20, a TP parser 30, an audio decoder 40, a D/A converter 50, a video decoder 60, an NTSC encoder 70, a user interface 80, a control unit 90, a memory 100, an external device interface 120, a combined channel memory 130 and OSP processing unit 140.

In particular, the antenna 10 receives terrestrial broadcast signals.

The tuner 20 seeks a channel selected by a user from the broadcast signals received via the antenna 10. In this case, the broadcast signal of the selected channel is converted to a transport stream. The transport stream includes 188-byte packets each of which is identified by a packet ID (PID).

The broadcast signal of the channel sought by the tuner 20 is inputted to the TP parser 30 in the form of the transport stream to go through demultiplexing to be parsed into an audio signal, a video signal and a supplementary information signal according to the packet ID.

The audio signal parsed by the TP parser 30 is decided by the audio decoder 40. The decided audio signal is converted to an analog signal by the D/A converter 50. The analog audio signal is then outputted through a speaker.

The video signal parsed by the TP parser is decoded by the video decoder 60. The decoded video signal is processed into a signal displayable on a screen by the NTSC encoder 70. the processed video signal is then displayed though such a monitor as CRT, LCD, PDP and the like.

The supplementary information signal parsed by the TP parser 30 includes channel information such as program titles, broadcast time, broadcast contents, broadcast ratings and a broadcasting station name of programs that are currently broadcast or will be broadcast. The parsed supplementary information signal is stored in the combined channel memory 130. Preferably, the combined channel memory 130 includes a non-volatile EEPROM as a readable/writable memory.

Meanwhile, the control unit 90 controls all activities of the video apparatus according to a program stored in the memory 100 and outputs a control signal according to a user request command inputted via the user interface 80.

The control unit 90 reads channel information from an external device (not shown in the drawing) via the external device interface 120 and then stores the read channel information in the combined channel memory 130. Alternatively, reading and storing the channel information from the external device can be achieved in a manner that the user request command instructing that the channel information of the external device shall be read is given to the control unit 90 via the user interface 80 to enable the control unit 90 to output the corresponding control signal. Yet, in a preferred embodiment of the present invention, reading and storing the channel information from the external device are preferably achieved in the following manner. First of all, if the video apparatus is turned on, the control unit decides whether the external device is connected. If the external device is connected, the control unit read the channel information from the external device via the external device interface 120 and then outputs a control signal for storing the read channel information in the combined channel memory 130. Thus, since the video apparatus according to the present invention automatically reads the channel information from the external device, it is unnecessary for the external device to be turned on. Instead, the external device just needs to stay in a standby mode where the external device is just connected to a power source instead of being turned on.

Meanwhile, the external device includes a satellite broadcasting reception set-top box (STB) or such a device being provided with a tuner capable of reception and channel seeking of satellite broadcasting as VCR, DVD, PVR (personal video recorder) and the like. The external device interface 120 is to provide a communication path between the external device and the control unit 90 and includes an interface capable of two-way communications.

According to the preferred embodiment of the present invention, the channel information stored in the combined channel memory 130 is edited into a combined channel map by the control unit 90 and are then re-stored. Thus, the re-stored combined channel map is processed into an OSD type broadcast channel guide image signal by the OSD (on screen display) processing unit 140 according to the control signal of the control unit 90. The OSD type broadcast channel guide image signal is inputted to the NTSC encoder 70 to be processed into a signal displayable on the screen. The processed broadcast channel guide image signal is displayed through such a monitor as CRT, LCD, PDP and the like.

Figure 4:
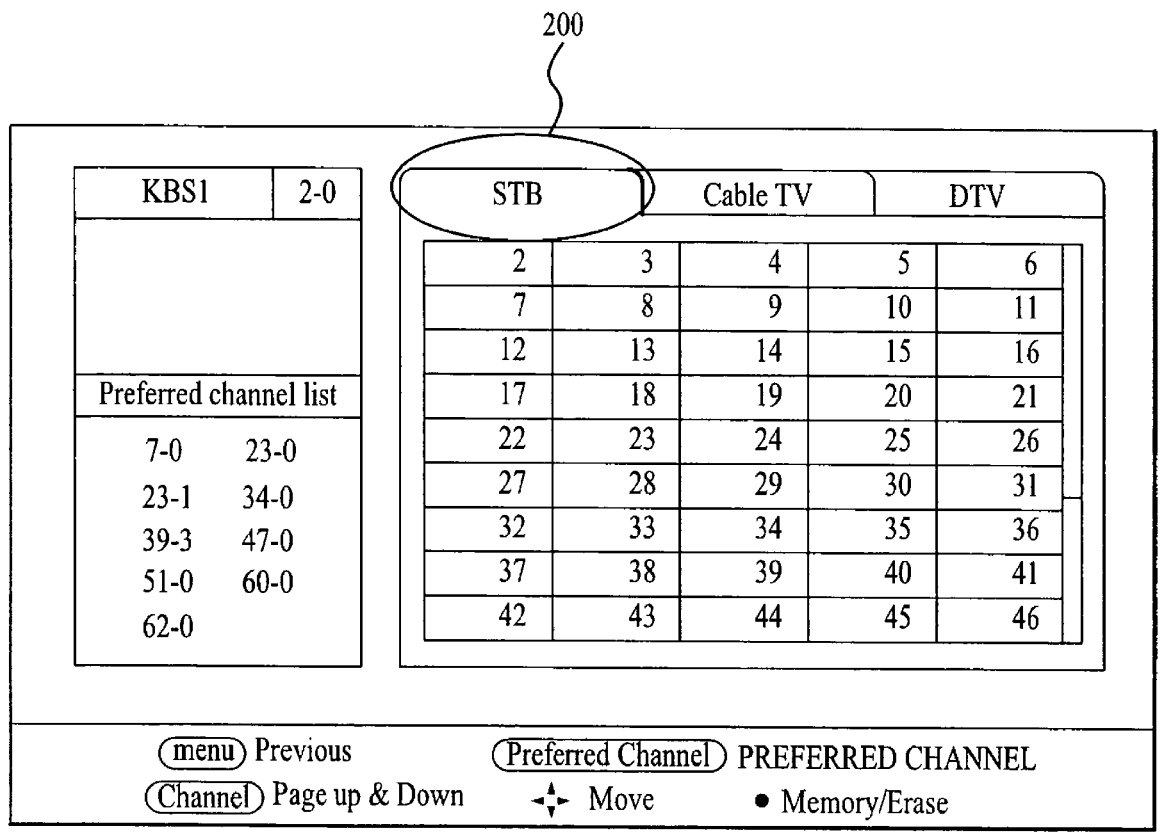
FIG. 4 is a diagram of a combined channel map type broadcast channel guide image displayed according to an embodiment of the present invention.

FIG. 4 is a diagram of a broadcast channel guide image displayed on a monitor according to an embodiment of the present invention. In the related art video device, the channel information displayed on the screen is limited to the channel information of the broadcast received by the related art video device. In case that a user intends to view the channel information of the broadcast received from the connected external device, the channel information of the corresponding broadcast is displayed on the condition that the viewing mode should be switched to the external device mode. Namely, although the channel information of each broadcast can be displayed, the related art video device is unable to display all the channel information of the respective broadcasts. Yet, in the video apparatus according to the preferred embodiment of the present invention, in addition to the channel information of the cable TV broadcasting system and digital broadcasting system received via the video apparatus, the broadcast guide image including a set-top box (STB) channel item 200 receive via the set-top box is displayed so that a user can conveniently obtain the channel information of the external device without the switching of the viewing mode.

Once the channel information received via the video apparatus and the external device is displayed as the combined channel map type broadcast guide image, a user can switch the channel between the video apparatus and the external device only by operating a channel switching key without switching of the viewing mode.

Meanwhile, in the preferred embodiment of the present invention, as mentioned in the foregoing description, if the turned-off external device is in the standby mode that the device is connected to the power source only, the control unit 90 of the video apparatus reads the channel information of the external device and then edits to store the read information in the combined channel memory 130 together with the channel information of the video apparatus to display the combined channel map type broadcast guide image. Thus, when the combined channel map type broadcast guide image is displayed while the external device is turned off, a user may intend to view a broadcast channel of the external device. In this case, a separate process of turning on the external device may be required.

Yet, according to the preferred embodiment of the present invention, in reading the broadcast channel information from the connected external device as the power of the video apparatus is turned on, the control unit 90 decides whether the power of the external device is in a turned-on mode or a standby mode only. If a user inputs a user request command of selecting a broadcast channel of the external device despite that the external device in the standby mode, The control unit 90 sends a control signal for turning on the power of the corresponding external device to a control unit (not shown in the drawing) of the external device via the external device interface 120. Hence, in the present invention, by combining the broadcast channel information of the turned-off external device with the broadcast channel information of the video apparatus and by managing the combined channel information, a user can select a broadcast channel of the turned-off external device. In this case, by a simple operation of the channel switching key without the separate process of turning on the power of the external device, the external device is automatically turned on as soon as the user selects a broadcast channel of the external device.

A detailed operation of the above-explained video apparatus according to one embodiment of the present invention is explained in detail with reference to FIG. 5 as follows.

Figure 5:
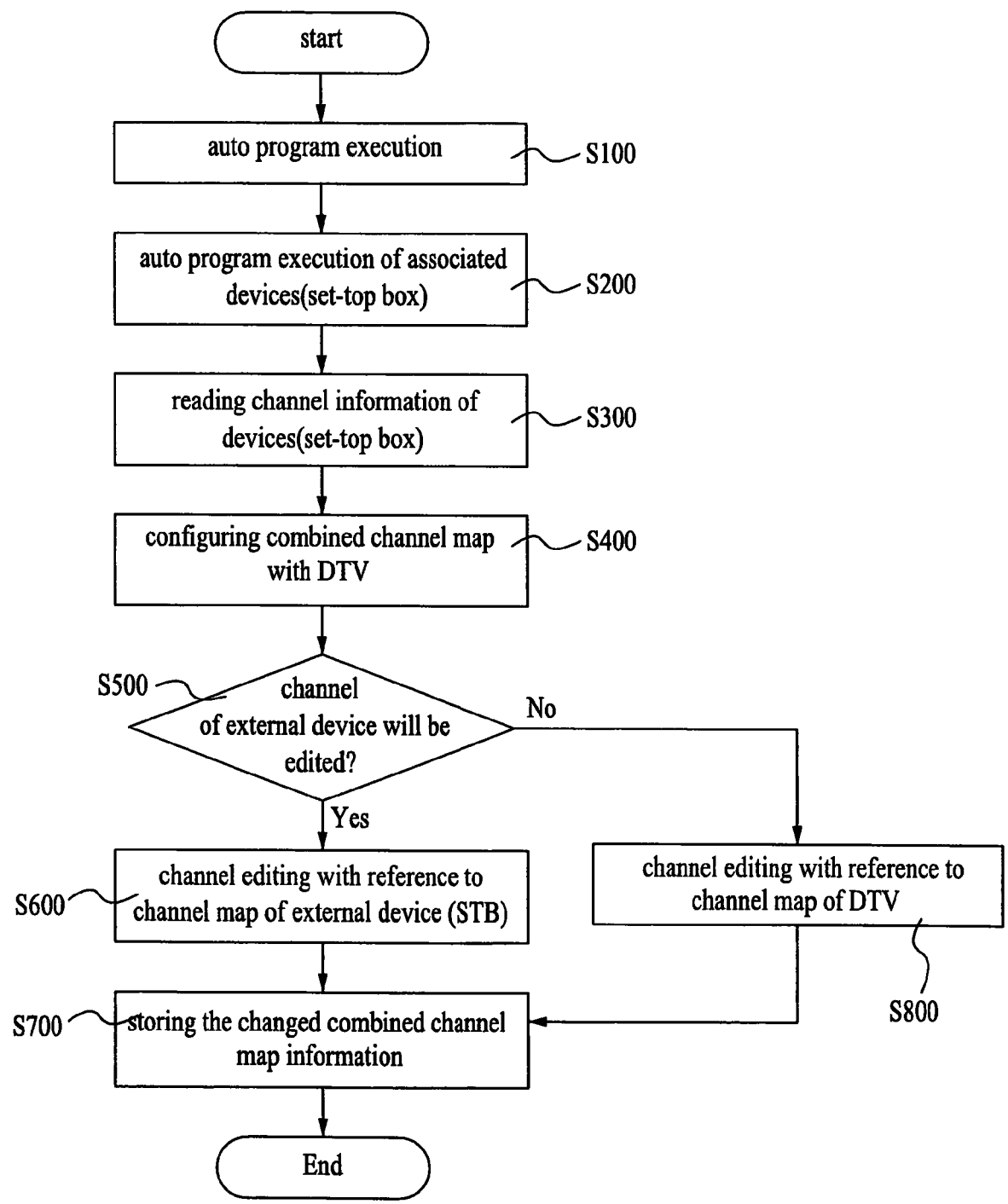
FIG. 5 is a flowchart of a channel operating method in a video apparatus according to the present invention.

FIG. 5 is a flowchart of a channel operating method in a video apparatus according to the present invention.

Referring to FIG. 5, according to a method for controlling a video apparatus of the present invention, if the video apparatus is turned on, the control unit 90 within the video apparatus executes an auto-program for automatically searching whether an external device is connected to the video apparatus through the external device interface 120 (S100). And, the auto-program is stored in the memory 100.

Moreover, if power of the external device is turned on, associated external devices are automatically operated according to programs set for them, respectively (S200).

If it is decided that the external device is connected in the step S100, the control unit 90 within the video apparatus automatically reads the channel information of the external device (e.g., set-top box) via the external device interface 120 according to the auto-program and stores the read channel information in the combined channel memory 130 (S300). The channel information of the external device can be read by the control unit 90 of the video apparatus only if the external device is in the standby mode, that is, the mode in which the external device is turned off but is connected to a power source. In this case, the control unit 90 decides whether the external device is in the standby mode or a turned-on mode.

Subsequently, a combined channel map is configured (S400). In particular, both of the channel information of the video apparatus and the channel information of the external device are stored in the combined channel memory 130 within the video apparatus to configure the combined channel map.

The control unit 90 then decides whether a user request command for requesting a channel editing execution of the external device is inputted from a user (S500).

As a result of the decision, if the command for requesting the channel editing of the external device is inputted, channels are edited with reference to a channel map of the external device (S600). In doing so, a preferred channel and the like can be set as shown in FIG. 4.

Subsequently, the edited combined channel map information is re-stored in the combined channel memory 130 (S700).

Yet, if the command for requesting the channel editing of the external device is not inputted, channels are edited with reference to a channel map of the video apparatus (S800).

If a user inputs a command for requesting a display of a broadcast guide image, the edited combined channel map is displayed in an OSD form on a screen under the control of the control unit 90.

If a user selects a specific channel based on the displayed broadcast guide image through a simple operation of the channel switching key without switching the viewing mode, the selected channel is broadcast (S1000). In this case, if it is decided in the step S300 that the external device receiving the broadcast of the selected channel is in the standby mode, the control unit 90 turns on the power of the corresponding external device by sending a control signal to the external device via the external device interface 120, Hence, a user can facilitate the channel switching between the video apparatus and the external device without switching the viewing mode. And, the user can view the broadcast through the external device without a separate operation of turning on the power of the turned-off external device.

So far, in the embodiment of the present invention, the video apparatus receives digital terrestrial broadcasting and the external device receives satellite broadcasting. And, the technical core of the present invention of combining to manage broadcast channels of the video apparatus and the external device is further applicable to the case where the video apparatus receives digital broadcasting and the external device receives analog broadcasting or to the case where the video apparatus receives analog broadcasting and the external device receives digital broadcasting.

Accordingly, the present invention provides the following effects or advantages.

First of all, the information of all channels received via the channel-selectable external device can be combined and managed by the video apparatus.

Secondly, for the combined management of the channel information, by storing the information of the channels of broadcasts received by the external device in the combined channel memory within the video apparatus automatically as soon as the power of the video apparatus connected to the external device, a user can be released from the inconvenience of inputting a separate user request command.

Thirdly, even if the power of the external device is turned off, the video apparatus combines and manages the channel information of the external device. Hence, a user can select a broadcast channel corresponding to the external device. If the broadcast channel corresponding to the external device is selected by a user, the power of the external device is made to be turned on automatically. Hence, the user can be released from the inconvenience of turning on the external device separately.

Fourthly, by editing the channel information of the video apparatus and the external device into the combined channel map, by storing the combined channel map in the combined channel memory, and by displaying the stored combined channel map as the broadcast guide image, a user is facilitated to grasp the channel information. Since the channel information includes program titles, broadcast time schedules, broadcast contents, broadcast ratings and broadcast station names, various kinds of information can be provided to a user. Hence, user's convenience can be maximized.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a video apparatus, comprising:
  storing channel information of a first broadcasting system in a combined channel memory;
  reading channel information of a second broadcasting system from an external device;
  storing the channel information of the second broadcasting system in the combined channel memory;
  displaying the channel information of the first broadcasting system and the second broadcasting system based on a combined channel map guide derived based on the channel information stored in the combined channel memory, wherein the combined channel map guide includes:
(a) a video apparatus viewing window for displaying channel information of the first broadcast system, and
(b) an external device viewing window for displaying channel information of the second broadcast system;
receiving a signal from a channel switching key that corresponds to a channel selected from the channel information displayed for the video apparatus viewing mode or the external device viewing mode; and
displaying the selected channel of the first or second broadcasting system according to the channel switching key that corresponds to the selected channel based on the displayed combined channel map guide,
wherein displaying the channel information further includes:
displaying a first tab corresponding to the video apparatus viewing window with a second tab corresponding to the external device viewing window in a same screen,
wherein:
the external device viewing window is displayed in overlapping relationship with the video apparatus viewing window in said same screen,
channel numbers of the first broadcasting system are displayed in the video apparatus viewing window in response to selection of the first tab,
channel numbers of the second broadcasting system are displayed in the external device viewing window in response to selection of the second tab, and
said channel numbers of the first broadcasting system are displayed to block viewing of said channel numbers of the second broadcasting system when the first tab is selected, and said channel numbers of the second broadcasting system are displayed to block viewing of said channel numbers of the first broadcasting system when the second tab is selected, wherein the first and second tabs are simultaneously displayed in said same screen with said channels numbers of the first broadcasting system or the second broadcasting system corresponding to a selected one of the first tab or the second tab,
wherein the method further comprises:
displaying a first area in said same screen simultaneously with the first and second tabs and said channels numbers of the first broadcasting system or the second broadcasting system corresponding to a selected one of the first tab or the second tab, wherein the first area includes information indicative of one or more preferred channels in at least one of the first or second broadcasting system,
wherein said information indicative of one or more preferred channels includes first information and second information simultaneously displayed on said same screen, and
wherein the first information includes a first symbol and a second symbol,
(a) the first symbol is indicative of a channel, and
(b) the second symbol is indicative of one of the first or second broadcasting systems to which the channel indicated by the first symbol corresponds, and
wherein the second information includes a third symbol and a fourth symbol,
(a) the third symbol is indicative of a channel, and
(b) the fourth symbol is indicative of one of the first or second broadcasting systems to which the channel indicated by the third symbol corresponds.

2. The method of claim 1, wherein the first broadcasting system is a digital broadcasting system and wherein the second broadcasting system is an analog broadcasting system.

3. The method of claim 1, wherein the first broadcasting system is an analog broadcasting system and wherein the second broadcasting system is a digital broadcasting system.

4. The method of claim 1, wherein the first broadcasting system is a digital broadcasting system and wherein the second broadcasting is a satellite broadcasting system.

5. The method of claim 1, wherein reading the channel information of the second broadcasting system includes:
deciding whether the video apparatus is connected to the external device from which the channel information of the second broadcasting system is read; and
reading the channel information of the second broadcasting system if the video apparatus is connected to the external device.

6. The method of claim 5, wherein said deciding is performed when the video apparatus is turned on.

7. The method of claim 1, further comprising:
editing the channel information of the first and second broadcasting systems stored in the combined channel memory;
generating a combined channel map based on the edited information; and
forming the combined channel map guide based on the combined channel map.

8. The method of claim 1, wherein the external device is selected from the group consisting of a VCR, a DVD, a set-top box, and a PVR.

9. The method of claim 1, wherein each of the first and second broadcasting channel information comprises one or more of program titles, broadcast time schedules, broadcast contents, broadcast ratings, channel number, or a broadcasting station name.

10. The method of claim 1, wherein the combined channel memory is stored in the video apparatus.

11. The method of claim 1, further comprising:
receiving channel information of the second broadcasting system from the external device;
generating a combined channel map based on the channel information of the first broadcasting system and the channel information of the second broadcasting system; and
storing the combined channel map in a memory of the video apparatus.

12. The method of claim 11, further comprising:
generating the combined channel map guide based on the combined channel map.

13. The method of claim 1, wherein said channel numbers of the first broadcasting system and said channel numbers of the second broadcasting system include one or more different channels and at least one same channel.

14. The method of claim 13, wherein the channels in at least one of the video apparatus viewing window or the external device viewing window are displayed in multiple columns set side-by-side in said same screen.

15. The method of claim 1, further comprising:
sending a control signal for turning on power to the external device based on the signal from the channel switching key, wherein the channel information of the second broadcasting system is read from the external device while the external device is in standby mode; and
after the external device has been turned off, turning on power of the external device automatically when the user selects a channel of the second broadcasting system from the combined channel map guide.

16. The method of claim 1, wherein at least one of the first symbol, second symbol, third symbol or fourth symbol is a number.

17. The method of claim 1, further comprising:
displaying a second area in said same screen simultaneously with the first and second tabs, the first area, and said channels numbers of the first broadcasting system or the second broadcasting system corresponding to a selected one of the first tab or the second tab, wherein the second area includes information to allow editing of the first area.

18. A video apparatus which receives channel information of a first broadcasting system, the video apparatus comprising:
an interface to communicate with an external device receiving channel information of a second broadcasting system;
a combined channel memory to combine and store the channel information of the first broadcasting system and the channel information of the second broadcasting system;
a monitor to display the channel information of the first broadcasting system and the second broadcasting system based on a combined channel map guide derived based on the channel information stored in the combined channel memory,
wherein the combined channel map guide includes:
(a) a video apparatus viewing window for displaying channel information of the first broadcast system, and
(b) an external device viewing window for displaying channel information of the second broadcast system, the monitor to display a selected channel of the first or second broadcasting system according to a channel switching key that corresponds to the selected channel based on channel information in the displayed combined channel map guide;
a controller to receive a signal from the channel switching key that corresponds to the selected channel from the displayed video apparatus viewing window or the external device viewing window, wherein:
the monitor displays a first tab corresponding to the video apparatus viewing window with a second tab corresponding to the external device viewing window in a same screen;
the external device viewing window is displayed in overlapping relationship with the video apparatus viewing window in said same screen,
channel numbers of the first broadcasting system are displayed in the video apparatus viewing window in response to selection of the first tab,
channel numbers of the second broadcasting system are displayed in the external device viewing window in response to selection of the second tab, and
said channel numbers of the first broadcasting system are displayed to block viewing of said channel numbers of the second broadcasting system when the first tab is selected, and said channel numbers of the second broadcasting system are displayed to block viewing of said channel numbers of the first broadcasting system when the second tab is selected, wherein the first and second tabs are simultaneously displayed in said same screen with said channels numbers of the first broadcasting system or the second broadcasting system corresponding to a selected one of the first tab or the second tab,
wherein the monitor displays a first area in said same screen simultaneously with the first and second tabs and said channels numbers of the first broadcasting system or the second broadcasting system corresponding to a selected one of the first tab or the second tab, wherein the first area includes information indicative of one or more preferred channels in at least one of the first or second broadcasting system,
wherein said information indicative of one or more preferred channels includes first information and second information simultaneously displayed on said same screen, and
wherein the first information includes a first symbol and a second symbol,
(a) the first symbol is indicative of a channel, and
(b) the second symbol is indicative of one of the first or second broadcasting systems to which the channel indicated by the first symbol corresponds, and
wherein the second information includes a third symbol and a fourth symbol,
(a) the third symbol is indicative of a channel, and
(b) the fourth symbol is indicative of one of the first or second broadcasting systems to which the channel indicated by the third symbol corresponds.

19. The video apparatus of claim 18, wherein if the video apparatus is turned on, the controller decides whether the video apparatus is connected to the external device and wherein if the video apparatus is connected to the external device, the controller reads the second broadcasting system channel information.

20. The video apparatus of claim 18, wherein the controller edits the channel information of the first and second broadcasting systems into a combined channel map, and wherein the combined channel map guide is generated based on the combined channel map.

21. The video apparatus of claim 18, wherein the external device is selected from the group consisting of a VCR, a DVD, a set-top box and a PVR.

22. The video apparatus of claim 18, wherein the channel information of each of the first and second broadcasting channel systems comprises one or more of program tides, broadcast time schedules, broadcast contents, broadcast ratings, channel number, or a broadcasting station name.

23. A video apparatus, which receives channel information of a digital broadcasting system, the video apparatus comprising:
an interface to communicate with an external device receiving channel information of an analog broadcasting system;
a combined channel memory to combine and store the channel information of the digital broadcasting system and the channel information of the analog broadcasting system;
a monitor to display the channel information of the digital broadcasting system and the analog broadcasting system in a combined channel map guide,
wherein the combined channel map guide includes:
(a) a video apparatus viewing window for displaying channel information of the digital broadcast system, and
(b) an external device viewing window for displaying channel information of the analog broadcast system, the monitor to display a selected channel of the digital or analog broadcasting system according to a channel switching key that corresponds to the selected channel based on information in the displayed combined channel map guide; and
a controller to receive a signal from the channel switching key that corresponds to the selected channel from the displayed video apparatus viewing window or the external device viewing window, wherein:

the monitor displays a first tab corresponding to the video apparatus viewing window with a second tab corresponding to the external device viewing window in a same screen, the external device viewing window is displayed in overlapping relationship with the video apparatus viewing window in said same screen, channel numbers of the digital broadcasting system are displayed in the video apparatus viewing window in response to selection of the first tab, channel numbers of the analog broadcasting system are displayed in the external device viewing window in response to selection of the second tab, and said channel numbers of the digital broadcasting system are displayed to block viewing of said channel numbers of the analog broadcasting system when the first tab is selected, and said channel numbers of the analog broadcasting system are displayed to block viewing of said channel numbers of the digital broadcasting system when the second tab is selected, wherein the first and second tabs are simultaneously displayed in said same screen with said channels numbers of the analog broadcasting system or the digital broadcasting system corresponding to a selected one of the first tab or the second tab, wherein the monitor displays a first area in said same screen simultaneously with the first and second tabs and said channels numbers of the analog broadcasting system or the digital broadcasting system corresponding to a selected one of the first tab or the second tab, wherein the first area includes information indicative of one or more preferred channels in at least one of the analog or digital broadcasting system, wherein said information indicative of one or more preferred channels includes first information and second information simultaneously displayed on said same screen, and wherein the first information includes a first symbol and a second symbol,
(a) the first symbol is indicative of a channel, and
(b) the second symbol is indicative of one of the analog or digital broadcasting systems to which the channel indicated by the first symbol corresponds, and wherein the second information includes a third symbol and a fourth symbol,
(a) the third symbol is indicative of a channel, and
(b) the fourth symbol is indicative of one of the analog or digital broadcasting systems to which the channel indicated by the third symbol corresponds.

24. The video apparatus of claim 23, wherein if the video apparatus is turned on, the controller decides whether the video apparatus is connected to the external device and wherein if the video apparatus is connected to the external device, the controller reads the analog broadcasting system channel information.

25. The video apparatus of claim 23, wherein the controller edits the channel information of the digital and analog broadcasting systems into a combined channel map, and wherein the combined channel map type broadcast guide image is generated based on the combined channel guide map.

26. The video apparatus of claim 23, wherein the external device is selected from the group consisting of a VCR, a DVD, a set-top box and a PVR.

27. The video apparatus of claim 23, wherein the channel information of each of the digital and analog broadcasting systems comprises one or more of program titles, broadcast time schedules, broadcast contents, broadcast ratings, channel number or a broadcasting station name.

28. A video apparatus, which receives channel information of an analog broadcasting system, the video apparatus comprising:

an interface to communicate with an external device receiving channel information of a digital broadcasting system;

a combined channel memory to combine and store the channel information of the analog broadcasting system and the channel information of the digital broadcasting system;

a monitor to display the channel information of the analog broadcasting system and the digital broadcasting system based on a combined channel map guide derived based on the channel information stored in the combined channel memory, wherein the combined channel map guide includes:
(a) a video apparatus viewing window for displaying channel information of the analog broadcast system, and
(b) an external device viewing window for displaying channel information of the digital broadcast system, the monitor to display a selected channel of the analog or digital broadcasting system according to a channel switching key that corresponds to the selected channel based on information in the displayed channel map guide;

a controller to receive a signal from the channel switching key that corresponds to the selected channel from the displayed video apparatus viewing window or the external device viewing window, wherein:
the monitor displays a first tab corresponding to the video apparatus viewing window with a second tab corresponding to the external device viewing window in a same screen, the external device viewing window is displayed in overlapping relationship with the video apparatus viewing window in said same screen, channel numbers of the analog broadcasting system are displayed in the video apparatus viewing window in response to selection of the first tab, channel numbers of the digital broadcasting system are displayed in the external device viewing window in response to selection of the second tab, and said channel numbers of the analog broadcasting system are displayed to block viewing of said channel numbers of the digital broadcasting system when the first tab is selected, and said channel numbers of the digital broadcasting system are displayed to block viewing of said channel numbers of the analog broadcasting system when the second tab is selected, wherein the first and second tabs are simultaneously displayed in said same screen with said channels numbers of the analog broadcasting system or the digital broadcasting system corresponding to a selected one of the first tab or the second tab, wherein the monitor displays a first area in said same screen simultaneously with the first and second tabs and said channels numbers of the analog broadcasting system or the digital broadcasting system corresponding to a selected one of the first tab or the second tab, wherein the first area includes information indicative of one or more preferred channels in at least one of the analog or digital broadcasting system, wherein said information indicative of one or more preferred channels includes first information and second information simultaneously displayed on said same screen, and wherein the first information includes a first symbol and a second symbol,
(a) the first symbol is indicative of a channel, and
(b) the second symbol is indicative of one of the analog or digital broadcasting systems to which the channel indicated by the first symbol corresponds, and wherein the second information includes a third symbol and a fourth symbol,
(a) the third symbol is indicative of a channel, and
(b) the fourth symbol is indicative of one of the analog or digital broadcasting systems to which the channel indicated by the third symbol corresponds.

29. The video apparatus of claim 28, wherein if the video apparatus is turned on, the controller decides whether the video apparatus is connected to the external device and wherein if the video apparatus is connected to the external device, the controller reads the digital broadcasting channel information.

30. The video apparatus of claim 28, wherein the controller edits the channel information of the analog and digital broadcasting systems into a combined channel map, and wherein the combined channel map guide is generated based on the combined channel map.

31. The video apparatus of claim 28, wherein the external device is selected from the group consisting of a VCR, a DVD, a set-top box and a PVR.

32. The video apparatus of claim 28, wherein the channel information of each of the digital and analog broadcasting systems comprises one or more of program titles, broadcast time schedules, broadcast contents, broadcast ratings, and channel number or a broadcasting station name.

33. A video apparatus, which receives channel information of a digital broadcasting system, the video apparatus comprising:
an interface to communicate with an external device receiving channel information of a satellite broadcasting system;
a combined channel memory to combine and store the channel information of the digital broadcasting system and the channel information of the satellite broadcasting system;
a monitor to display the channel information of the digital broadcasting system and the satellite broadcasting system based on combined channel map guide derived based on the channel information in the combined channel memory,
wherein the combined channel map guide includes:
(1) a video apparatus viewing window for displaying channel information of the digital broadcast system, and
(2) an external device viewing window for displaying channel information of the satellite broadcast system, the monitor to display a selected channel of the digital or satellite broadcasting system according to a channel switching key that corresponds to the selected channel based on information in the displayed combined channel map guide;
a controller to receive a signal from the channel switching key that corresponds to the selected channel from the displayed video apparatus viewing window or the external device viewing window, wherein:
the monitor displays a first tab corresponding to the video apparatus viewing window with a second tab corresponding to the external device viewing window in a same screen,
the external device viewing window is displayed in overlapping relationship with the video apparatus viewing window in said same screen,
channel numbers of one of the digital broadcasting system are displayed in the video apparatus viewing window in response to selection of the first tab,
channel numbers of the satellite broadcasting system are displayed in the external device viewing window in response to selection of the second tab, and
said channel numbers of digital broadcasting system are displayed to block viewing of said channel numbers of the satellite broadcasting system when the first tab is selected, and said channel numbers of satellite broadcasting system are displayed to block viewing of said channel numbers of the digital broadcasting system when the second tab is selected, wherein the first and second tabs are simultaneously displayed in said same screen with said channels numbers of the digital broadcasting system or the satellite broadcasting system corresponding to a selected one of the first tab or the second tab, wherein the monitor displays a first area in said same screen simultaneously with the first and second tabs and said channels numbers of the digital broadcasting system or the satellite broadcasting system corresponding to a selected one of the first tab or the second tab, wherein the first area includes information indicative of one or more preferred channels in at least one of the digital or satellite broadcasting system, wherein said information indicative of one or more preferred channels includes first information and second information simultaneously displayed on said same screen, and wherein the first information includes a first symbol and a second symbol,
(a) the first symbol is indicative of a channel, and
(b) the second symbol is indicative of one of the digital or satellite broadcasting systems to which the channel indicated by the first symbol corresponds, and wherein the second information includes a third symbol and a fourth symbol,
(a) the third symbol is indicative of a channel, and
(b) the fourth symbol is indicative of one of the digital or satellite broadcasting systems to which the channel indicated by the third symbol corresponds.

34. The video apparatus of claim 33, wherein if the video apparatus is turned on, the controller decides whether the video apparatus is connected to the external device and wherein if the video apparatus is connected to the external device, the controller reads the satellite broadcasting system channel information.

35. The video apparatus of claim 33, wherein the controller edits the channel info nation of the digital and satellite broadcasting systems into a combined channel map, and wherein the combined channel map guide is generated based on the combined channel guide map.

36. The video apparatus of claim 33, wherein the external device is selected from the group consisting of a VCR, a DVD, a set-top box and a PVR.

37. The video apparatus of claim 33, wherein the channel information of each of the digital and satellite broadcasting systems comprises one or more of program titles, broadcast time schedules, broadcast contents, broadcast ratings, channel number and a broadcasting station name.

* * * * *